United States Patent [19]

Underwood

[11] Patent Number: 4,929,028
[45] Date of Patent: May 29, 1990

[54] LIFT HITCH

[76] Inventor: Lowell A. Underwood, P.O. Box 452, Prosper, Tex. 75078

[21] Appl. No.: 193,774

[22] Filed: May 13, 1988

[51] Int. Cl.$^5$ .......................... B60P 1/16; B62D 53/04
[52] U.S. Cl. ............................... 298/19 R; 280/490.1; 280/491.3; 280/491.4; 280/500; 293/116; 293/117
[58] Field of Search .................. 280/456 R, 467, 468, 280/478 R, 479 R, 487, 491 B, 491 R, 479 A, 456.1, 479.1, 491.1, 491.2, 505, 511, 490.1, 491.3, 491.4, 500; 293/116, 117; 298/19 R

[56] References Cited

U.S. PATENT DOCUMENTS

| | | | |
|---|---|---|---|
| 3,066,983 | 12/1962 | Bay | 280/479 R |
| 3,580,613 | 5/1971 | Northrop | 293/117 X |
| 3,717,362 | 2/1973 | Johnson | 293/117 X |
| 3,891,239 | 6/1975 | Leo et al. | 280/479 R |
| 4,159,833 | 7/1979 | Meiners | 293/117 X |
| 4,570,966 | 2/1986 | Giboney et al. | 280/491 B X |

*Primary Examiner*—Robert J. Spar
*Assistant Examiner*—Janice Krizek
*Attorney, Agent, or Firm*—Ronnie D. Wilson

[57] ABSTRACT

A hitch apparatus having a modular configuration for mounting to a vehicle, in order to conveniently hitch a trailer thereto. The modular hitch apparatus has movable structure that is configured for selectively tilting a trailer with respect to the vehicle so as to facilitate loading and unloading equipment, automobiles, materials, etc., onto or off of the trailer. The hitch apparatus includes an elongated chamber-like structure that has an open top and an interior which is in communication with the open top. The chamber-like structure may be configured to be anchored to the frames of a variety of vehicles including conventional pickup trucks, cars, etc. The chamber-like structure is sized and configured in the manner of a conventional pickup truck bumper. The apparatus further includes an engageable member such as a ball hitch movably connected to a structural trailer part (e.g. a trailer hitch socket). This ball hitch is mounted for movement with respect to the chamber-like structure, so that the combination hitch connection may be selectively positioned through the use of extendable members. Thus, the ball hitch may be moved between two major positions; one being a lowered position adjacent the chamber-like structure and the other being a raised position above the chamber-like structure. The extendable members move an engageable member in such a way as to facilitate aligning the engageable member with the hitchable structure of a trailer, so that the engageable member and trailer may be more easily connected.

33 Claims, 2 Drawing Sheets

LIFT HITCH

BACKGROUND OF THE INVENTION

This invention relates generally to a hitch apparatus; more particularly, it relates to a hitch apparatus which may be conveniently mounted to a vehicle for use in hitching a trailer or the like and for lifting one end of the trailer with respect to the vehicle.

It is well known to load or unload a trailer used to transport heavy equipment, automobiles, etc. by placing ramps at the rear end of the trailer, so that the equipment may be rolled onto or off of the trailer. However, in the construction industry, for example, loading and unloading heavy-duty equipment such as a bulldozer, front loader, forklift, etc., can be time-consuming and bothersome, because at least two persons are required to lift and position the often bulky and cumbersome ramps next to the rear of the trailer. Another drawback of such a method is that specially constructed ramps are generally required for the trailer; and in many cases, ramps that fit one type of trailer could not conveniently be used on a different type of trailer.

One way of making it more convenient to load or unload equipment would be to elevate the hitch connection between the trailer and towing vehicle so as to tilt the entire equipment trailer; obviously, this would not only facilitate driving any equipment onto or off of the trailer, but it would also eliminate the need for custom-made trailer ramps. Moreover, this way of unloading a trailer could also be used to launch a boat into a lake or to dump materials from a trailer or the like. Unfortunately, many vehicles such as conventional pickup trucks or cars which might be used to tow equipment trailers, boat trailers, etc., are equipped with ball-like hitches that are fixedly anchored to the vehicle bumper, which is in turn rigidly mounted to the vehicle frame. Thus, there would be no easy way of tilting the trailer to facilitate unloading the contents thereof In addition, this type of fixedly anchored hitch configuration creates another problem for persons attempting to connect the vehicle hitch to the trailer; namely, there is no convenient way of aligning the hitch structure of the vehicle with the towing tongue of the trailer so as to make the hitch connection. In other words, typically the driver of the towing vehicle must attempt—sometimes over and over again—to accurately position the vehicle so as to align the hitch (which he usually cannot see) with the towing structure of the trailer. And anyone who has tried to do this by himself knows that it is both very difficult and extremely frustrating to attempt to "blindly" align a hitch with a trailer.

Of course, there have been various prior art devices which have been designed to at least partially address some of the above set forth problems. Several of these devices, which might be classified as movable hitch assemblies, have been proposed for towing and maneuvering heavy trailers adapted to carry mobile home modular units and the like. Exemplary of such devices are those shown in U.S. Pat. No. 4,564,209 to Kingsley et al entitled "Trailer Hitch Assembly" and No. 3,891,239 to Leo et al entitled "Hydraulically Operated Hitch for Towing and Positioning Mobile Homes." The Kingsley '209 patent discloses a rather bulky and massive configuration adapted to be carried by a towing vehicle in a piggy-back fashion. The Kingsley hitch includes horizontal and vertical ram assemblies which have various rail and plate members for guiding it in a vertical or horizontal direction Regrettably, the Kingsley hitch is so heavy and cumbersome that the truck frame is required to be reinforced by a plurality of vertical stiffener and diagonal brace members All of this structural reinforcement to the heavy-duty truck is presumably necessary in order for Kingsley to tow mobile homes It should be clear that with such a mounting construction, it would be difficult to attach the Kingsley device to the rear of a conventional pickup truck—unless major modifications and reinforcements were made to the truck frame It would also be highly impractical to attempt to mount such a bulky device to the rear of a car in order to use it to lift one end of a boat trailer or the like.

Like the Kingsley patent, the Leo '239 patent also shows that the frame of his towing vehicle is reinforced, so that his hitch device can be mounted thereto. With this configuration, it is unlikely that the Leo hitch could readily be affixed to the back of a vehicle such as a conventional pickup truck—or car—without major modifications to the vehicle.

Another device shown in U.S. Pat. No. 4,162,086 to Bond et al entitled "Trailer Apparatus and Ground Support Therefore," addresses the need to elevate and tilt a trailer, so as to more easily dump the contents of the trailer However, the thrust of the Bond patent deals with a specially constructed trailer adapted to facilitate collecting, compacting, transporting and disposing solid waste material. Furthermore, the hitch of the Bond device is not adapted to be moved laterally with respect to the vehicle so as to facilitate aligning the hitch with the towing structure of the trailer. And a quick glance at FIGS. 1 and 5 of Bond's patent reveals that his hitch device could not easily be mounted to a conventional pickup truck without occupying a large portion of the space in the pickup bed.

One other prior art device, shown in U.S. Pat. No. 2,771,306 to Ash entitled "Power-Actuated Laterally and Vertically Adjustable Draft Means," serves as an auxiliary steering arrangement for vehicles such as tractors. The primary focus of the Ash '306 patent is that of providing a device which facilitates the steering of a tractor or the like while it is pulling a farm implement. The Ash device includes a draw bar to which a load such as a disk harrow or rotary plow is attached. The draw bar is forcibly moved sideways by a horizontally-acting motor, so that the line of application of the load is shifted laterally relative to the center of the towing vehicle. This complicated, multi-part apparatus is presumably constructed and adapted for compelling the vehicle to hold a desired direction of travel while pulling an implement such as a plow. However, with such a configuration, it is highly unlikely that Ash intended for his device to be mounted to the rear end of a pickup truck in order to pull a plow through a pasture or the like. In fact, Ash's device does not have any structure which could be attached to a conventional pickup truck.

While most of the above-described devices have been constructed for use in towing and positioning a trailer, mobile home, etc., it seems that the designers of these prior art devices have not given sufficient attention to the need for a hitching device which may conveniently be mounted to a vehicle such as a conventional pickup truck or car—without major modification thereto. Accordingly, there has remained the need for a modular, self-contained hitch apparatus which has a movable hitch, and which may easily be mounted to a conventional pickup truck, car, etc., so as to facilitate aligning the hitch structure in order to lift one end of the trailer. It is an object of this invention to provide such a modular hitch apparatus.

Another object is to provide a hitch apparatus which has a bumper-like configuration, so that it may be mounted to a conventional pickup truck, car, etc., without major modification to the frame of the vehicle.

One other object is to provide a hitch apparatus having movable members that are adapted to be retracted so as to be stowed and concealed within the hitch apparatus.

Still another object is to provide a hitch apparatus which has an actuating means that is also adapted to be concealed within the interior of the hitch apparatus.

One more object is to provide a means for anchoring the movable members of the hitch apparatus in an extended configuration so as to stabilize the hitch structure when it is in a raised position.

These and other objects will no doubt be apparent from a reading of the specification and claims, and from a study of the accompanying drawings illustrating certain facets of the invention.

BRIEF DESCRIPTION OF THE INVENTION

In brief, the invention includes a hitch apparatus which has a modular configuration that is adapted to be readily mounted to a vehicle, so that the apparatus may be used to conveniently hitch a trailer or the like. This modular hitch apparatus has movable structure that is configured for selectively tilting a trailer with respect to the vehicle so as to facilitate loading and unloading equipment, materials, etc., onto or off of the trailer.

In one embodiment, the hitch apparatus includes an elongated chamber-like structure that has an open top and an interior which is in communication with the open top. The chamber-like structure may be configured to be anchored to the frames of a variety of vehicles including conventional pickup trucks, cars, etc. In the preferred embodiment of the invention, the chamber-like structure is sized and configured in the manner of a conventional pickup truck bumper With this construction, the hitch apparatus is self-contained, and it is ideally adapted to be mounted to a pickup truck frame without any significant modification of the frame.

In order to hitch a trailer, the apparatus includes an engageable member such as a ball hitch that is adapted to be movably connected to a structural trailer part (e.g., a trailer hitch socket). The ball hitch is mounted for movement with respect to the chamber-like structure, so that the combination hitch connection may be selectively repositioned. The chamber-like structure preferably includes an elongated housing; and pivotally mounted within the housing is a means for causing the ball hitch to be moved with respect to the housing. The causing means is extendable through the open top of the housing in order to move the ball hitch to a desired location away from the housing. Preferably, the causing means constitutes a telescoping member and a guide member that are pivotally connected to each other in order that they may be articulated with respect to each other; the ball hitch is ideally mounted to a guide member. In this way, the telescoping member and guide member may be articulated and configured to elevate the ball hitch to a desired height above the housing, such that the end of the trailer that is connected to the ball hitch may be raised with respect to the vehicle.

The causing means is alternately retractable to a stowed configuration, such that the ball hitch may be positioned immediately adjacent the housing, and the causing means may be partially concealed therein. Thus, the ball hitch may be moved between two major positions: one being a lowered position adjacent the housing and the other being a raised position above the housing. A means for actuating the causing means is preferably mounted within the housing. A control switch may be mounted to the housing or inside the vehicle near the driver in order to selectively connect power to the actuating means.

DETAILED DESCRIPTION OF THE PREFERRED EMBODIMENT OF THE INVENTION

Figure 1:
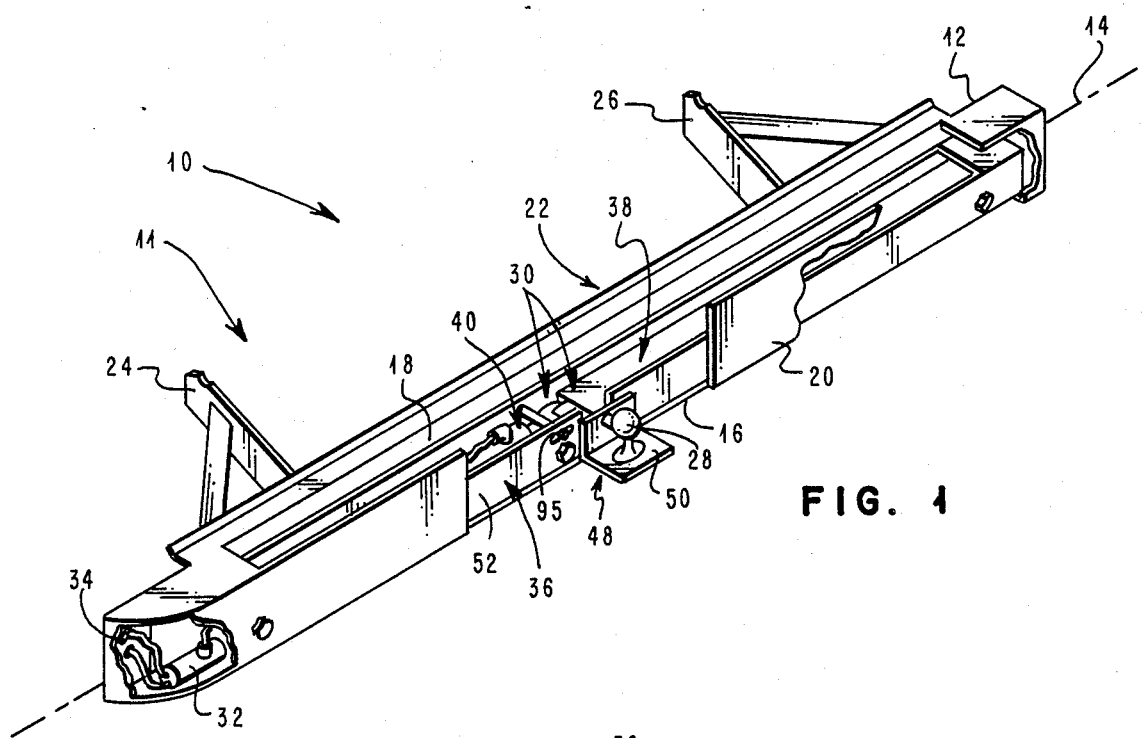
FIG. 1 is a perspective view of a modular hitch apparatus that is configured to be mounted to a vehicle, with said apparatus including a housing adapted to accommodate a telescoping member and a guide member, and also including a movable hitch member that is positioned immediately adjacent the housing, and showing the left end of the housing broken away to reveal a means for actuating the telescoping member.
Figure 2:
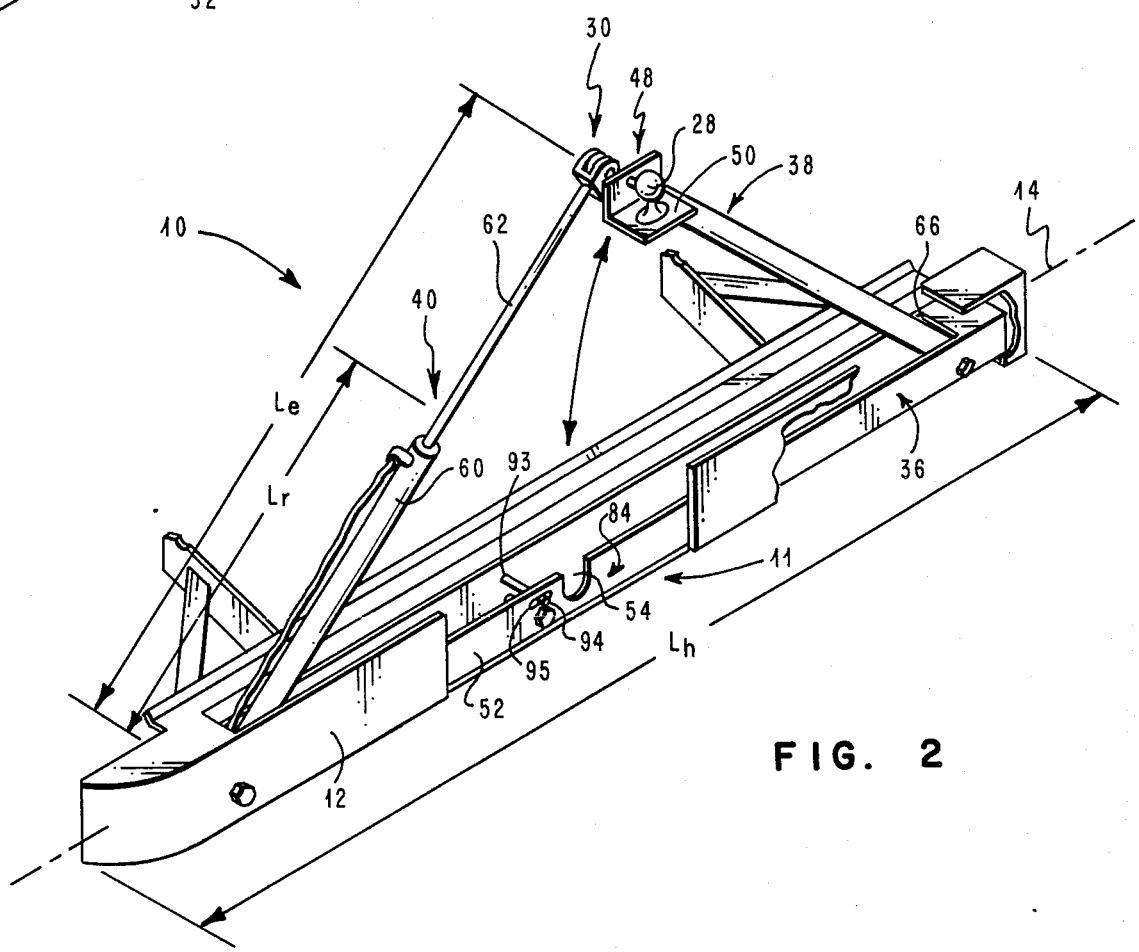
FIG. 2 is a perspective view of the hitch apparatus showing the telescoping member extended outwardly of the housing, with the hitch member raised above the housing.

Referring initially to FIGS. 1 and 2, a hitch apparatus 10 is shown as it would appear before being mounted to a vehicle such as a pickup truck or the like. The hitch apparatus 10 is self-contained and it has a modular configuration that is adapted to be mounted to a conventional pickup truck frame without any significant modification thereto. The hitch apparatus 10 includes a generally elongated chamber-like structure 11 that has a centerline 14 extending in a longitudinal direction. The chamber-like structure 11 includes a housing 12 which is adapted to receive at least a portion of a movable structure of the hitch apparatus 10. The housing 12 has a base 16, an open top 18, a first wall 20 and a second wall 22, with the interior of the housing being in communication with the open top 18 thereof; the first and second walls are spaced apart and they preferably lie in generally parallel planes. In the preferred embodiment, the housing 12 is adapted to be mounted to a conventional pickup truck or the like in such a way that the first and second walls 20, 22 lie in substantially vertical planes. With the orientation of the housing in mind, it should also be mentioned that the terms horizontal and vertical, upper and lower, outer and inner, etc., shall be used herein as if the hitch apparatus 10 were mounted to the rear end of a conventional pickup truck, with the housing base 16 oriented in a substantially horizontal plane Thus, what would appear to be up or down, horizontal or vertical, etc., with respect to the base 16 when it is generally level shall be used herein as reference directions. Moreover, even though the invention described herein is particularly adapted to be mounted to a pickup truck, it should be readily apparent to anyone skilled in the art that the invention could also be adapted for use on a variety of other vehicles such as dump trucks, wreckers, cars, etc. However, to provide an example of one specific application, the versatile hitch apparatus will be described hereinafter as being used on a conventional pickup truck in order to facilitate engagement with a trailer hitch and also to selectively raise one end of the trailer with respect to the truck so as to tilt the trailer relative to the ground.

The elongated housing 12 has mounting structure 24 and 26 that is adapted to be mounted in the place of a conventional pickup truck bumper. Housing 12 is sized and shaped such that the housing exterior has a bumper-like construction; the length of housing 12 is generally dependent on the width of the pickup truck. For example, if the subject invention is used with a 1987 Chevrolet pickup truck the length of the housing 12 is preferably about 73 inches (This length is represented by the notation Lh in FIG. 2.) Clearly, housing 12 is advantageously configured so that it may easily be formed from a standard pickup truck bumper; and one type of bumper that is particularly well suited for a 1987 Chevrolet pickup truck may be obtained from Bumper Manufacturing of Fort Worth, Texas under the Model No. U116.

As illustrated in FIG. 1, a movable hitch member 28 is adapted to be positioned immediately adjacent the housing 12. The movable hitch member or hitch 28 is engageable with a trailer hitch structure, and hitch 28 is mounted for moving away from the housing 12. Pivotally mounted inside the housing 12 is a means for causing hitch 28 to be moved with respect to the housing. Causing means 30, which preferably includes at least one telescoping member 40, is selectively extendable outwardly of the housing 12 through the open top 18 thereof to a fully extended configuration (as shown in FIG. 2). Causing means 30 is alternately retractable to a stowed configuration inside the housing 12 (as shown in FIG. 1). With such a construction, hitch 28 is mounted for movement in a generally vertical plane, such that it may be moved between two major positions: one being a lowered position adjacent housing 12, and the other being a raised position above the housing 12.

A means 32 for actuating causing means 30 is preferably mounted inside and near one end of housing 12. In order that the hitch 28 may be moved to a desired position at will, the apparatus 10 includes a control means for selectively activating the actuating means. The control means preferably includes a switch 34 that is mounted to the housing 12; another control switch may be mounted near the driver of the vehicle, so that the driver may conveniently operate the hitch apparatus 10 from inside the vehicle.

The chamber-like structure further includes an elongated channel-like structure 36 that is constructed so that it may be installed within housing 12. Channel-like structure 36 (or channel) has an open top that is in communication with the open top 18 of housing 12: and the interior of the channel is judiciously sized and configured in order that it may snugly accommodate at least a portion of causing means 30. When causing means 20 is in its lowered, stowed configuration, channel 36 and housing 12 cooperate to form a protective double-walled construction so as to partially envelop at least a portion of the causing means 30. In the preferred embodiment of the invention, the causing means 30 includes an elongated guide member 38 and a telescoping member 40, with both members being pivotally mounted inside channel 36; both members are also pivotally connected to each other in such a way that they may be articulated relative to each other. The hitch 28 is preferably mounted to the guide member 38 so that the hitch may be moved when both members 38, 40 are articulated.

Figure 3:
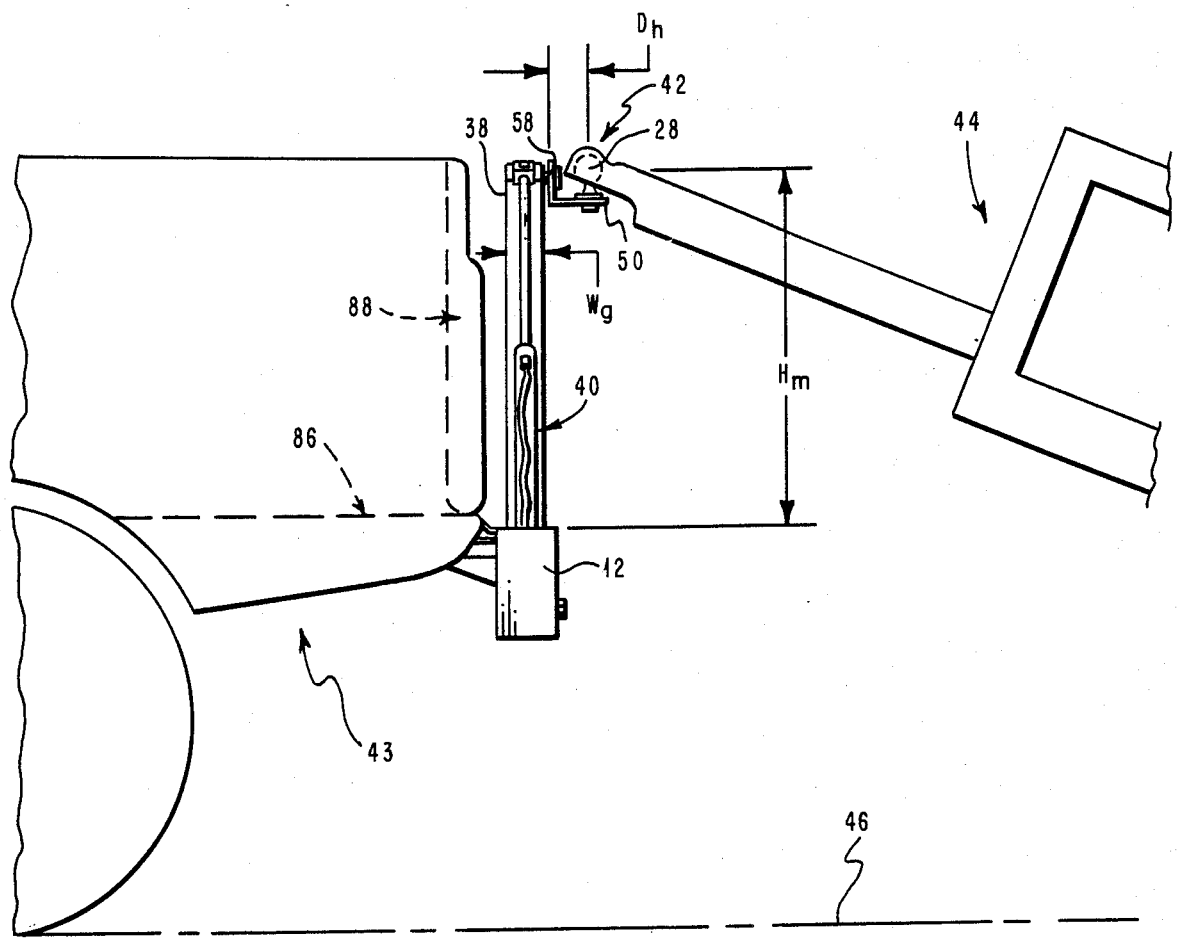
FIG. 3 is a side view of the modular hitch apparatus mounted to the rear end of a conventional pickup truck, and showing the movable hitch member coupled with a trailer hitch structure, with the combination hitch coupling being elevated above the housing such that the trailer is tilted with respect to the ground.

Referring again to FIG. 2 and additionally to FIG. 3, telescoping member 40 has a fully extended length (Le) which is almost twice its retracted length (Lr): the telescoping member may be extended so as to cooperate with guide member 38 to lift hitch 28 to a desired height above the housing 12. In this way, a trailer hitch structure 42 that is attached to hitch 28 may be elevated (with respect to a truck 43) so as to tilt the trailer 44 relative to the ground 46. When telescoping member 40 is extended by actuating means 32, guide member 38 will pivot upwardly (with respect to housing base 16) through open top 18 of housing 12; both members 40, 38 may be cooperatively articulated so as to form a triangular arrangement with housing base 16 in order to create an elevated supporting structure for hitch 28 (in its raised position). In this particular embodiment, telescoping member 40 may be fully extended to a length (Le) of about 46 inches, so as to cause hitch member 28 to be moved upwardly to a height of about 18 inches above housing 12; this height is identified by the notation Hm as shown in FIG. 3. When telescoping member 40 is retracted, both members are adapted to pivot downwardly until they form a generally coaxial arrangement inside the chamber-like construction 36/12. Moreover, it should be readily apparent from FIG. 3 that the telescoping and guide members 40, 38 may be retracted inside the housing and channel 12, 36 in such a way that the hitch apparatus does not interfere with the lowering of a tailgate 88 which might be mounted to the rear end of the truck 43. This is because the housing 12 is adapted to be mounted to the truck, such that the top of the housing 12 lies in a plane which is below a plane established by the truck bed 86.

The hitch apparatus 10 further includes a hitch-support structure 48 having a platform 50 adapted for anchoring hitch member 28 which is preferably shaped like a ball hitch; of course, many other types of hitch members may be also used with apparatus 10. The hitch-support structure 48 is ideally mounted to guide member 38 in such a way that platform 50 will remain oriented in a relatively horizontal plane when guide member 38 is being raised and lowered with respect to housing 12. Such a construction fosters freedom of movement between hitch 28 and trailer hitch 42 (e.g., a ball hitch socket), so that the hitch connection 28/42 will not bind when the hitch member is moved between its raised and lowered positions. In addition, hitch member 28 may be detachably mounted to the hitch-support structure 48 so that various sizes and configurations of hitches may be mounted thereto; this interchangeability feature permits the hitch member 28 to be used with a variety of trailers.

The channel-like structure 36 has an outer face 52 with a slot 54 extending upwardly through to the top edge of the outer face. The slot 54 may be sized and shaped to receive a neck-like portion 58 of the hitch-support structure 48; in this way, the channel outer face 52 forms a partition between causing means 30 and hitch 28. Thus, when causing means 30 is completely retracted to a stowed position inside housing 12, the hitch 28 will be held in a lowered position outside of housing 12. By virtue of the partition-like face 52, trailer hitch structure 42 that might accidentally become unhitched from member 28 would be prevented from readily contacting—and possibly damaging—causing means 30. The hitch-support structure 48 is configured such that hitch 28 is disposed near the end of platform 50 that is away from guide member 38. The hitch 28 is preferably displaced perpendicularly from face 52 by a distance of about 3 inches as represented by the notation Dh shown in FIG. 3. With such a configuration, a substantial clearance is provided between outer face 52 and hitch 28 with the result that the hitch may be freely moved upwardly and downwardly in a generally vertical plane that is displaced from channel outer face 52.

The variable length telescoping member 40 of this particular embodiment preferably includes a hydraulic cylinder 60 and a piston rod member 62; accordingly, actuating means 32 would include a hydraulic mechanism such as a pump for driving piston rod member 62 so as to selectively extend and retract it with respect to the hydraulic cylinder 60. In this embodiment, a hydraulic cylinder/piston rod unit having a rating of about 4,000 pounds may be used to lift a typical load of about 1,200 pounds. Suitable hydraulic equipment including a hydraulic cylinder/piston rod unit and hydraulic pump may be obtained from Hannon Hydraulic of Irving, Texas under the notation of 2 ton ⅝ inch by 21 inch, for the cylinder/piston rod unit and 12V high pressure, for the hydraulic pump; a miniaturized hydraulic pump would be preferred, so that it could be conveniently mounted within the housing.

In addition, the hitch apparatus 10 provides a means for securing the telescoping member 40 (or hydraulic cylinder/piston rod unit) and guide member 38 in a stowed configuration inside the housing 12. The securing means preferably constitutes a pin-like member 94 that is adapted to be inserted into apertures 93, 95 in channel 36 in such a way as to block any upward movement of the telescoping member 40. Thus, both members 40, 38 would be prevented from inadvertently being extended through the top of housing 12.

Referring to FIGS. 1-4, guide member 38 ideally has a fixed length, and it has a width that is slightly less than the interior width of channel 36, so as to be snugly captured within channel 36 when member 38 is lowered to its stowed configuration. In the preferred embodiment, guide member 38 has a width of about 3 inches and a thickness of about 2½ inches; the width is identified by notation Wg in FIG. 3, and the thickness is identified by the notation Tg in FIG. 4. The guide member 38 preferably has a rectangular tube-like shape and it is configured so as to resist compressive and tensive loads which might be axially imparted to the member 38 when the hitch 28 is engaged with a trailer with a trailer hitch structure 42. With this construction, guide member 38 is sized so that it may withstand a compressive axial load that exceeds the load limits of the pickup truck being used. Thus, the guide member and telescoping member together can generally support any load that can be carried by a ½ ton, ¾ ton, 1 ton truck etc.; of course, both members could be sized and configured to support heavier loads.

Figure 4:
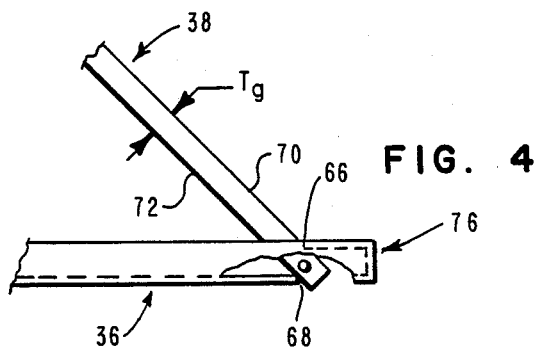
FIG. 4 is a fragmentary side view of a channel-like structure having one end that is configured to block rotation of the guide member.

The channel 36 includes a means for blocking pivotal rotation of guide member 38, and said means is adapted to automatically engage the guide member so as to hold the hitch 28 in a fully raised position above housing 12. This blocking means is also configured to cooperate with the telescoping member to anchor or "lock" guide member 38 in a fully rotated and raised position. As shown in FIGS. 2 and 4, the blocking means ideally constitutes an upper edge 66 and a lower edge 68 of a box-like construction 76 formed near one end of channel 36. The edges 66, 68 are respectively configured and positioned so as to simultaneously engage the upper surface 70 and lower surface 72 of guide member 38 when it is rotated in a clockwise direction to its fully raised position. In this way, telescoping member 40 and guide member 38 may be "locked" in a fully extended configuration so as to provide stable support for hitch 28 when it is coupled with a trailer.

Figure 5:
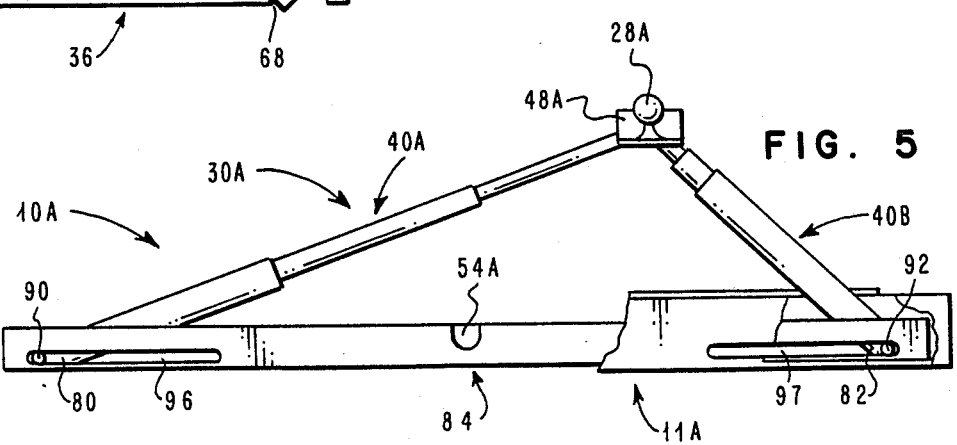
FIG. 5 is a front elevational view of another embodiment of the invention, illustrating a chamber-like structure, with a portion of the chamber-like structure being broken away for clarity, and the chamber-like structure being configured to slidably mount two extendable members, said extendable members being adapted to align an engageable member with a trailer hitch.

Referring next to FIG. 5, another embodiment of the invention is illustrated, with hitch apparatus 10A being adapted such that an engageable member 28A may conveniently be aligned for engagement with the structural part of a trailer. This embodiment has an elongated chamber-like structure 11A that is adapted for receiving causing means 30A which has movable structure that preferably includes at least one extendable member. Causing means 30A is configured for moving the engageable member 28A upwardly and laterally with respect to a central region 84 of the chamber-like structure 11A so as to facilitate aligning member 28A for engagement with a trailer; this configuration also fosters positioning of a trailer that is already engaged with member 28A.

In order to increase the alignment capability of the hitch apparatus 10A, the causing means 30A ideally includes two extendable members 40A, 40B (e.g., multiple-stage hydraulic cylinder/rod units), with each extendable member also being retractable to a stowed configuration inside chamber-like structure 11A. With such a construction, the engageable member 28A may be selectively moved upwardly and laterally with respect to the central region 84 of the chamber-like structure 11A.

Moreover, each of the two extendable members 40A, 40B has a base 80,82, with the base of each extendable member preferably being slidably mounted to the elongated chamber-like structure 11A. The chamber-like structure 11A provides elongated slots 96, 97 which extend in a longitudinal direction with respect to the chamber-like structure; the slots are sized and configured to receive bolt-like members 90,92 that extend outwardly from the base of each of extendable member 40A, 40B. In this way, base 80, 82 of a respective extendable member 40A, 40B may be moved in a generally longitudinal direction with respect to the chamber-like structure. Thus, with this configuration, engageable member 28A may be selectively moved to a variety of remote locations with respect to chamber-like structure 11A when base 80, 82 of one or both of extendable members 40A, 40B is moved in a generally longitudinal direction.

In use, the hitch apparatus 10 (or 10A) is initially connected to a trailer; this may be accomplished by positioning the vehicle in such a way as to align hitch member 28 with the trailer hitch, so that they may be engaged with each other. Once a secure hitch connection 28/42 has been made, the hitch apparatus may be used to tilt the trailer with respect to the ground 46 in order to facilitate loading or unloading objects from the trailer. Before operating the hitch apparatus, the securing pin 94 is removed from channel 36 to permit telescoping and guide members 40, 38 to be rotated upwardly. To operate hitch apparatus 10, the control switch 34 is used to activate actuating means 32 so as to extend telescoping member 40 and thereby rotate guide member 38 in a clockwise direction through the top of housing 12. In this way, members 40, 38 are configured for elevating hitch 28 to a desired height about housing 12, and in conjunction therewith raising trailer hitch 42 that is connected to hitch 28. The trailer 44, therefore, may be tilted to an appropriate angle so as to facilitate loading or unloading objects such as equipment, automobiles, materials, etc. Alternately, actuating means 32 may be used to retract telescoping member 40 in order to lower hitch connection 38/42 to a position immediately adjacent housing 12. With the telescoping and guide members 40, 38 in their stowed configuration, securing pin 94 is reinserted into apertures 93, 95 to prevent the members from inadvertently being raised through housing top 18.

To operate the embodiment of FIG. 5, extendable members 40A, 40B are selectively extended and/or retracted until engageable member 28A is moved to a desired position. Like telescoping member 40, extendable members 40A, 40B are operated by an actuating means (not shown). This configuration may be used to conveniently align engageable member 28A with a trailer hitch so as to facilitate making the hitch connection. After the hitch connection is made, hitch apparatus 10A may also be used to facilitate positioning the trailer. In addition, to provide further alignment capability, bases 80,82 of extendable members 40A, 40B may be moved longitudinally toward or away from the central region 84 of the chamber-like structure 11A, so that the engageable member may be moved higher above, or further toward one side of, the chamber-like structure. After the bases 80,82 are positioned as desired, nuts and bolt type fasteners (not shown) may be used to anchor the bases to the chamber-like structure 11A.

While only certain preferred embodiments of the invention are disclosed herein in substantial detail, it should be apparent to those skilled in the art that modifications of various parts of the invention may be accomplished without departing from the spirit of the invention. For example, a lid could be mounted to the top of the housing in order to completely conceal the telescoping member and guide member when they are stowed inside the housing. Also, the hitch apparatus could be sized and configured to be mounted to smaller vehicles such as cars and the like. Too, the hitch apparatus could have a sturdier configuration that is adapted to be mounted to the rear of a wrecker truck; and the causing means and the engageable member could be constructed like a wrecker attachment used for lifting one end of a vehicle (e.g. a car, truck, etc.) in order that it may be towed. Thus, any structure shown herein is intended to be exemplary and is not meant to be limiting, except as set forth in the claims appended hereto.

What is claimed is:

1. A hitch comprising:
    a. an elongated chamber-like structure having an open top and an interior in communication with said top, said chamber-like structure having a configuration adapted for anchoring to a structural part of a mobile transporting means and is sized and configured like a conventional pickup truck bumper;
    b. an engageable member mounted for movement with respect to said chamber-like structure, said engageable member adapted for connection to a structural trailer part;
    c. means for causing said engageable member to move with respect to said chamber-like structure, said causing means being extendable through said top of said chamber-like structure in order to move said engageable member to a desired location away from said chamber-like structure, said causing means being retractable to a stowed configuration inside said chamber-like structure so as to position said engageable member immediately adjacent said chamber-like structure; and
    d. means for actuating said causing means.

2. Apparatus as claimed in claim 1 wherein said chamber-like structure is configured to conceal a portion of said causing means.

3. Apparatus as claimed in claim 1 wherein said engageable member is mounted for movement in a generally vertical plane, and wherein said engageable member may be moved between two major positions, one being a lowered position adjacent said chamber-like structure and the other being a raised position above said chamber-like structure.

4. Apparatus as claimed in claim 1 wherein said causing means is configured for elevating said engageable member to a desired height above said chamber-like structure, and in conjunction therewith raising said structural trailer part connected thereto.

5. Apparatus as claimed in claim 1 wherein said causing means includes at least one extendable member.

6. Apparatus as claimed in claim 1 wherein said causing means has structure configured for moving said engageable member upwardly and laterally with respect to a central region of said chamber-like structure so as to facilitate aligning said engageable member for engagement with a structural trailer part.

7. Apparatus as claimed in claim 6 wherein said causing means includes two extendable members, each of which is retractable, that enable said engageable member to be selectively moved upwardly and laterally with respect to the central region of said chamber-like structure.

8. Apparatus as claimed in claim 7 wherein each of said extendable members has a base slidably mounted to said chamber-like structure in such a way that said base may be moved in a generally longitudinal direction with respect to said chamber-like structure to selectively move said engageable member to remote locations with respect to said chamber-like structure.

9. A hitch configured to be mounted to a vehicle, wherein a structural portion of said hitch is adapted to be engaged with a trailer hitch structure, comprising:
    a. a generally elongated housing having a centerline extending in a longitudinal direction, a base, an open top, a first and second wall, an interior in communication with said top, and mounting structure adapted to be mounted to said vehicle;
    b. A movable hitch member being engageable with said trailer hitch structure, and mounted for moving away from said housing;
    c. means for causing said movable hitch member to move with respect to said housing, mounted inside said housing, selectively extendable outwardly of said housing through said top to an extended configuration, and retractable to a stowed configuration inside said housing; and d. an elongated channel-like structure within said housing, having an open top that is in communication with said open top of said housing, with the interior thereof being sized and configured to accommodate said causing means;

e. means for actuating said causing means, so that said hitch member is selectively moved to a desired position.

10. Apparatus as claimed in claim 9 wherein said channel-like structure and said housing cooperate to form a protective double-walled construction to partially envelop said causing means in its stowed configuration.

11. Apparatus as claimed in claim 9 and further including a means for securing said causing means in its stowed configuration in order to prevent same from inadvertently being extended through said top of said housing.

12. Apparatus as claimed in claim 9 wherein said causing means includes at least one telescoping member.

13. Apparatus as claimed in claim 9 wherein said causing means includes an elongated guide member and a telescoping member, both of said members being pivotally mounted to said channel-like structure, pivotally connected to each other in such a way that they may be articulated relative to each other with said hitch member being mounted to said guide member.

14. Apparatus as claimed in claim 13 wherein said telescoping member has a fully extended length which is almost twice its retracted length, and wherein said telescoping member may be extended so as to cooperate with said guide member to lift said hitch member to a desired height above said housing.

15. Apparatus as claimed in claim 9 wherein said hitch member is mounted for movement in a generally vertical plane, and wherein said hitch member may be moved between two major positions, one being a lowered position adjacent said housing and the other being a raised position above said housing.

16. Apparatus as claimed in claim 13 wherein said channel-like structure includes a means for blocking pivotal rotation of said guide member so as to hold said hitch member in a fully raised position above said housing.

17. Apparatus as claimed in claim 16 wherein said means for blocking pivotal rotation of said guide member is configured so as to cooperate with said telescoping member to hold said guide member in a fully raised position.

18. Apparatus as claimed in claim 13 wherein said telescoping member has a variable length, and wherein the length of said guide member may be fixed, such that said telescoping member may be extended by said actuating means so as to cause said guide member to pivot upwardly with respect to the housing base through the open top of said housing, whereby both members may be cooperatively articulated so as to form a triangular arrangement with said housing base in order to support said hitch member, and whereby said telescoping member may be retracted such that both members may be pivoted downwardly to form a generally coaxial arrangement inside said housing.

19. Apparatus as claim in claim 12 wherein said telescoping member includes a hydraulic cylinder and a piston rod member.

20. Apparatus as claimed in claim 19 wherein said actuating means includes a hydraulic mechanism for driving said piston rod member so as to selectively extend and retract said piston rod member with respect to said hydraulic cylinder.

21. Apparatus as claimed in claim 13 wherein said guide member has a rectangular shape, and is configured so as to resist compressive and tensive loads axially imparted to said guide member when said hitch member is engaged with a trailer hitch structure.

22. Apparatus as claimed in claim 13 wherein said guide member has a width of about 3 inches and a thickness of about 2½ inches.

23. Apparatus as claimed in claim 13 and further including a hitch-support structure having a platform for anchoring said hitch member, said hitch-support structure being mounted to said guide member in such a way that said platform will remain oriented in a relatively horizontal plane when said guide member is being raised and lowered with respect to said housing.

24. Apparatus as claimed in claim 23 wherein said hitch member is detachably mounted to said hitch-support structure, in order that various sizes and configurations of hitch members may be mounted to the hitch-support structure.

25. Apparatus as claimed in claim 23 wherein said channel-like structure has an outer face with a slot extending upwardly through to the top edge of said outer face, and said slot is sized and configured to receive a neck-like portion of said hitch-support structure such that the outer face creates a partition between said causing means and said hitch member, whereby when said causing means is completely retracted to a stowed position inside said housing, said hitch member will be held in a lowered position outside said housing.

26. Apparatus as claimed in claim 25 wherein said hitch member is disposed near one end of said platform, said one end being away from said guide member, such that said hitch member may be moved in a generally vertical plane that is displaced away from said outer face of said channel-like structure, whereby there is a substantial clearance between said outer face and said hitch member.

27. Apparatus as claimed in claim 26 wherein said hitch member is displaced perpendicularly from said outer face of said channel-like structure by a distance of about 3 inches.

28. Apparatus as claimed in claim 13 wherein said elongated channel-like structure has an interior with a width that is slightly greater than that of said guide member.

29. Apparatus as claimed in claim 9 wherein said housing is sized and shaped such that said housing exterior has a vehicular bumper-like construction, and wherein the mounting structure of said housing is configured so that said housing may be mounted in the place of a conventional truck bumper.

30. Apparatus as claim in claim 13 wherein said elongated housing has a length of about 73 inches whereby said channel-like structure may snugly capture said guide member when it is lowered to its stowed configuration.

31. Apparatus as claimed in claim 9 wherein said elongated housing is mounted to a conventional pickup truck such that said open top of said housing lies in a plane which is below a plane established by the truck bed, and wherein said causing means may be retracted inside said housing.

32. Apparatus as claimed in claim 9 and further including a control means for activating said actuating means.

33. Apparatus as claimed in claim 32 wherein said control means is mounted near the driver of the vehicle in order to conveniently operate said hitch apparatus from inside the vehicle.

* * * * *